No. 633,002. Patented Sept. 12, 1899.
A. D. HILL.
COIN CONTROLLED SKIMMED MILK MEASURER.
(Application filed Feb. 4, 1899.)
(No Model.) 4 Sheets—Sheet 4.
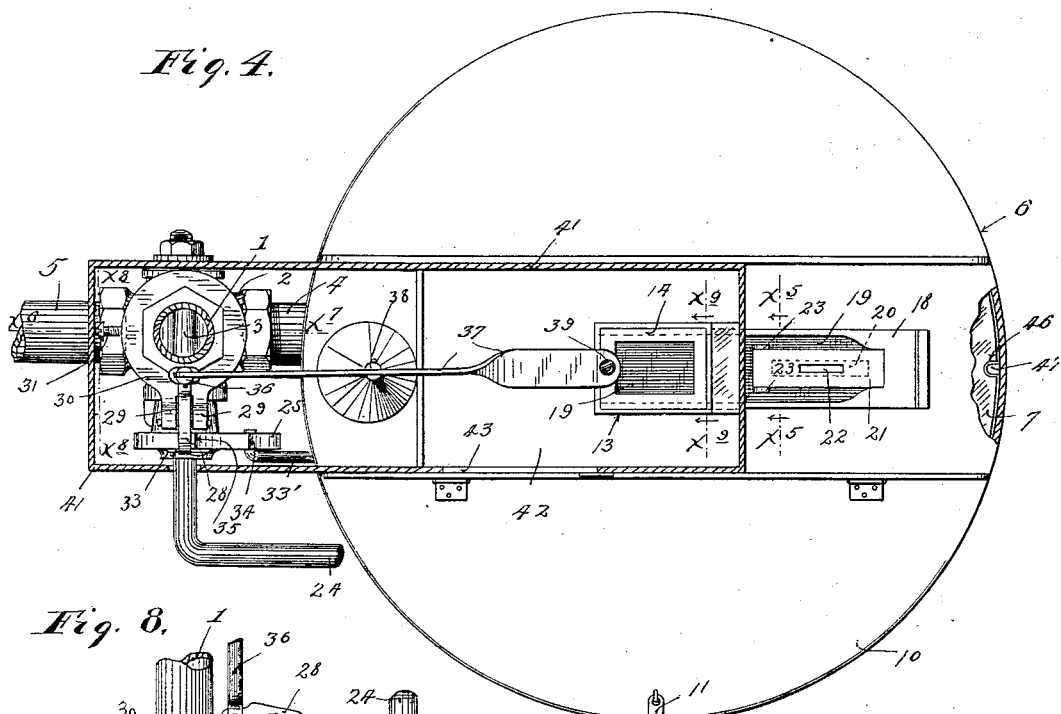
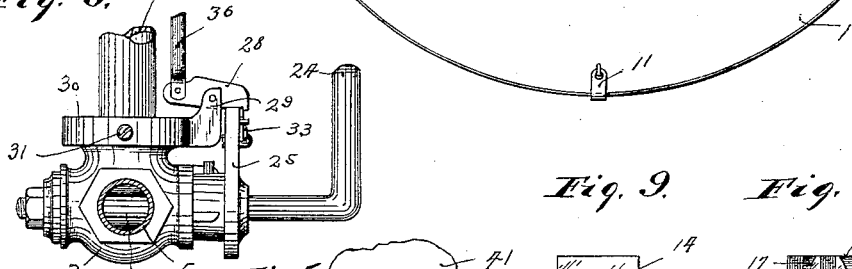
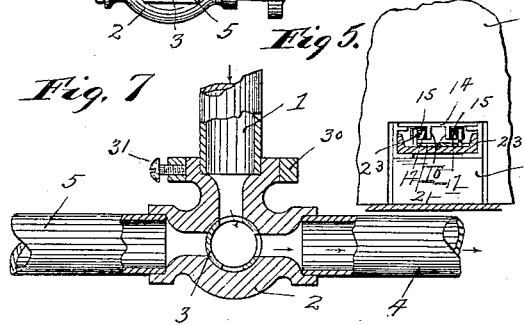
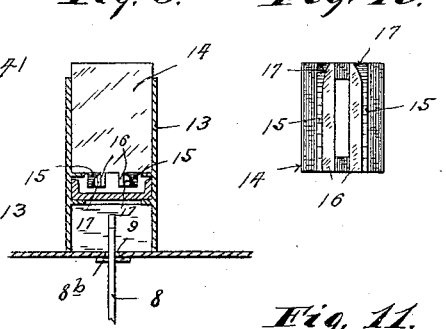
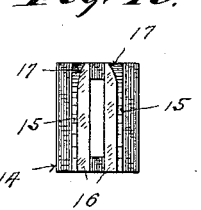
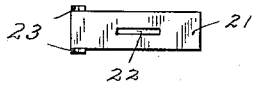
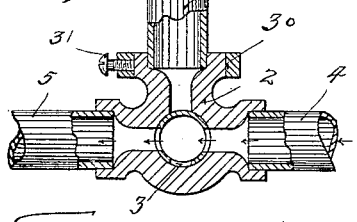
Witnesses,
Harry Kilgore
F. D. Merchant
Inventor,
Adelbert D. Hill,
By his Attorney
Jas. F. Williamson

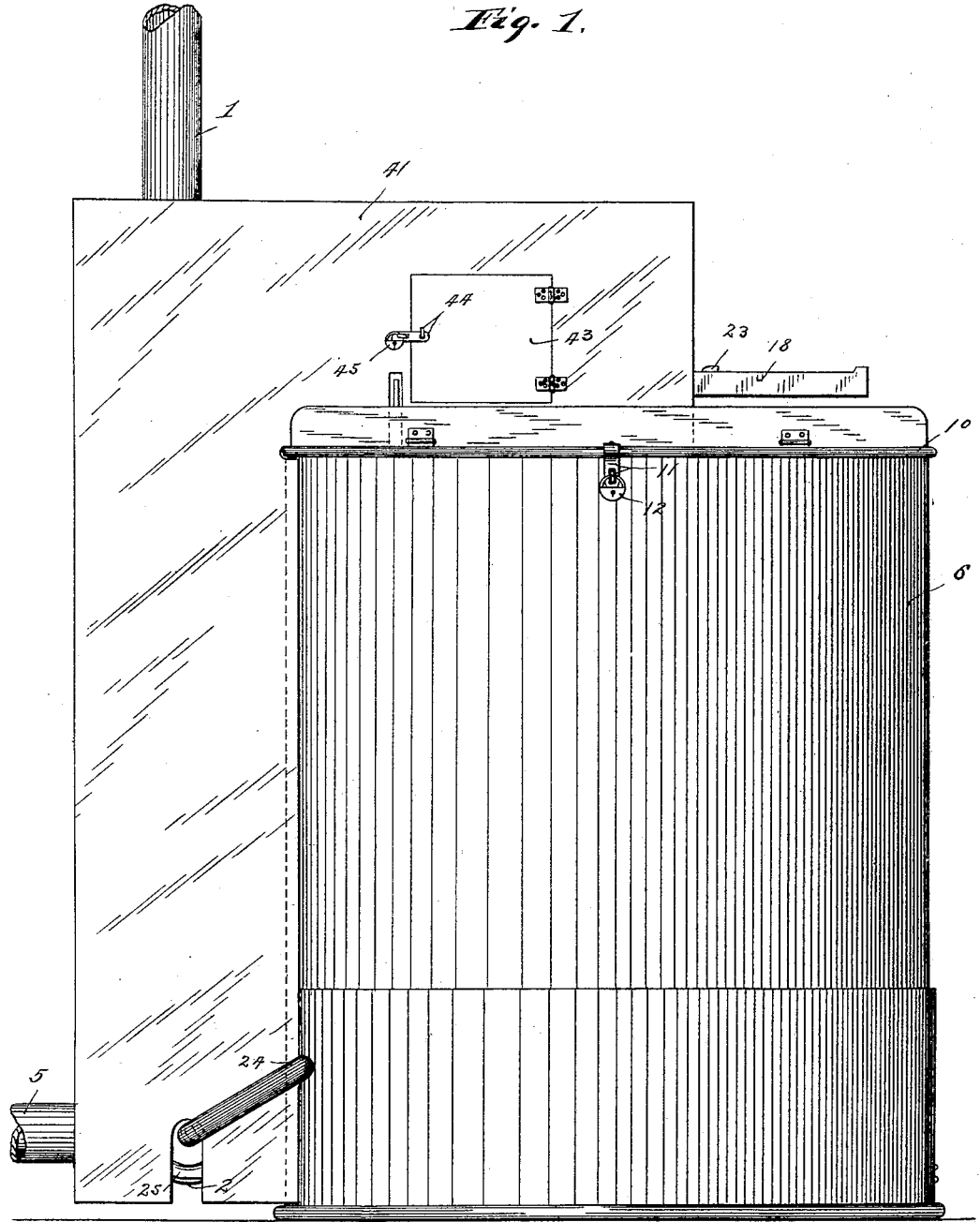

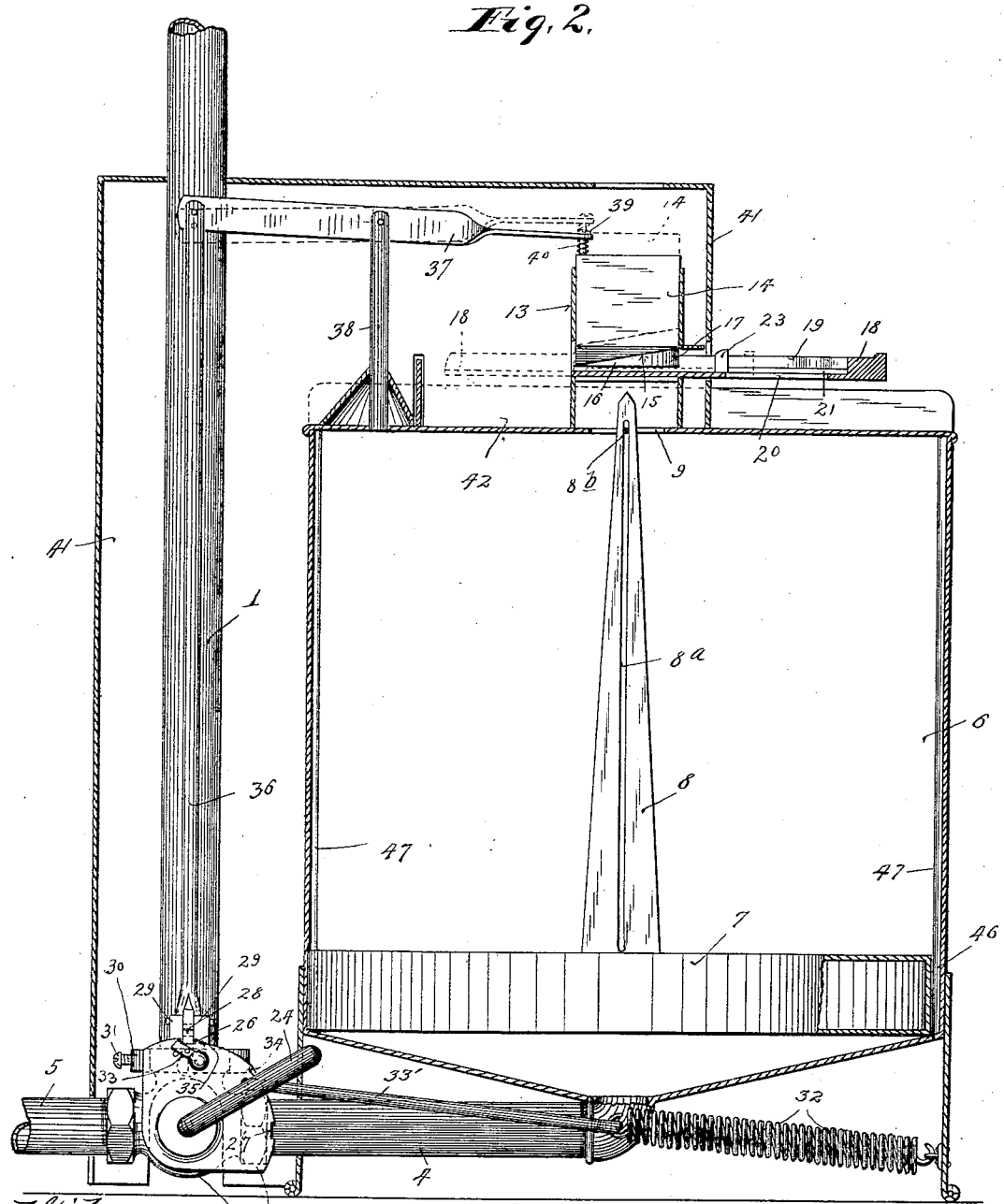

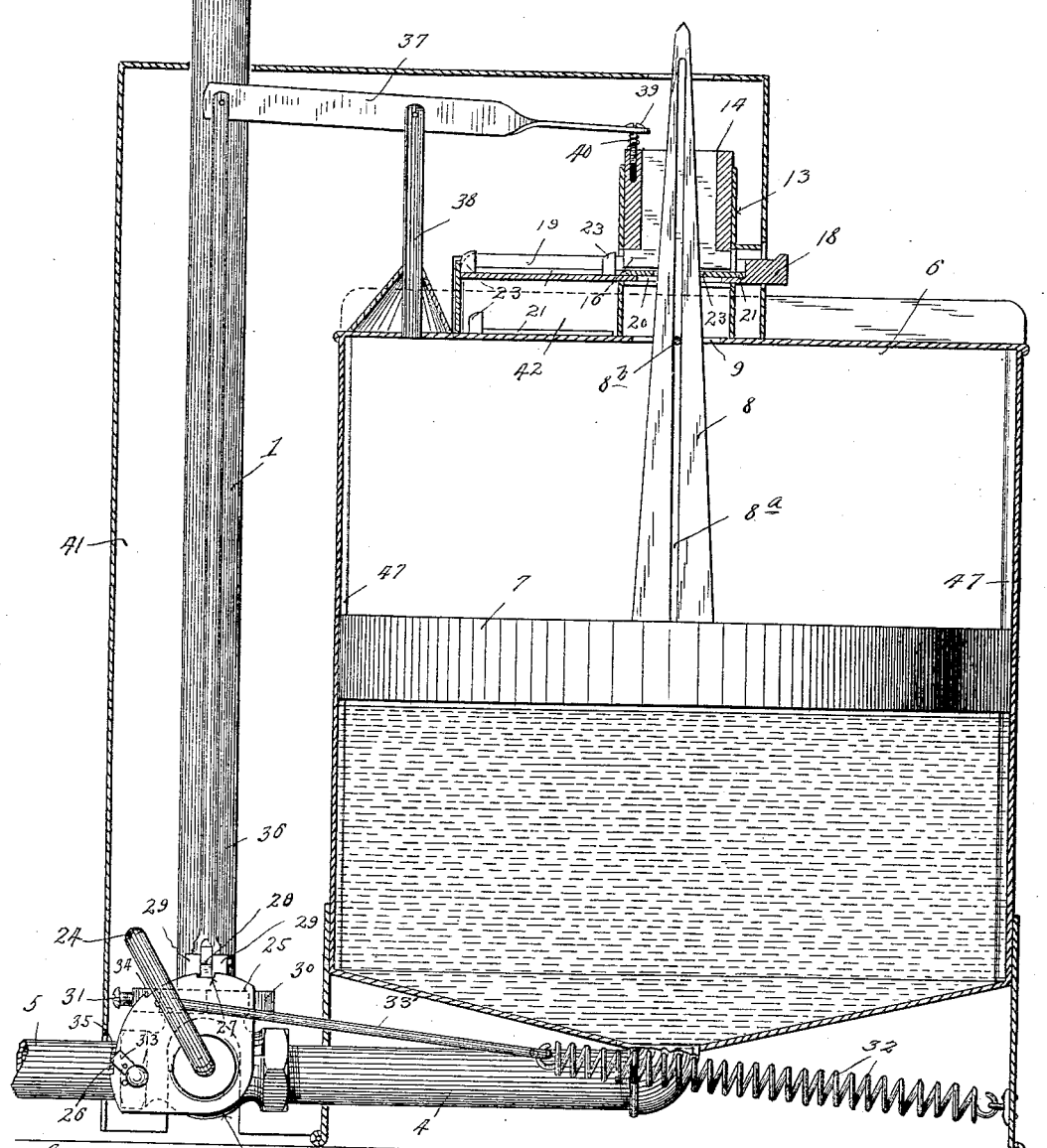

UNITED STATES PATENT OFFICE.

ADELBERT D. HILL, OF NORTHFIELD, MINNESOTA.

COIN-CONTROLLED SKIMMED-MILK MEASURER.

SPECIFICATION forming part of Letters Patent No. 633,002, dated September 12, 1899.

Application filed February 4, 1899. Serial No. 704,468. (No model.)

*To all whom it may concern:*

Be it known that I, ADELBERT D. HILL, a citizen of the United States, residing at Northfield, in the county of Rice and State of Minnesota, have invented certain new and useful Improvements in Skimmed-Milk Measurers; and I do hereby declare the following to be a full, clear, and exact description of the invention, such as will enable others skilled in the art to which it appertains to make and use the same.

My present invention relates to devices for dispensing or delivering liquids and is specially designed to meet the requirements of creameries for the convenient and accurate delivery of the proper quantities of skimmed milk to the farmers or other customers.

It is the especial object of my present invention to provide a device for the above purpose which will not only accurately measure the various quantities of skimmed milk to which the farmers or customers are entitled, but which will perform these measurements without requiring the services of an attendant and which at the same time will not be dependent on the honesty of the customer who draws off his particular portion.

My invention consists of the novel devices and combinations of devices hereinafter described, and defined in the claims.

The preferred form of the apparatus by which I accomplish the above objects is illustrated in the accompanying drawings, wherein like characters indicate like parts throughout the several views.

Figure 1 is a view in side elevation, illustrating the entire apparatus. Fig. 2 is a vertical section taken centrally through a portion of the apparatus, but with some parts shown in full. Fig. 3 is a view corresponding to Fig. 2, but illustrating different positions of the parts. Fig. 4 is a plan view of the apparatus, with some parts removed and others shown in section. Fig. 5 is a transverse vertical section taken approximately on a line $x^5 x^5$ of Fig. 4. Figs. 6 and 7 are detailed views in vertical section, taken approximately on the line $x^6 x^7$ of Fig. 4, but illustrating different positions of the three-way valve. Fig. 8 is a detail taken in transverse vertical section approximately on the line $x^8 x^8$ on Fig. 4. Fig. 9 is a detail in transverse vertical section taken on the line $x^9 x^9$ of Fig. 4. Fig. 10 is a bottom plan showing the cam-block removed from working position, and Fig. 11 is a plan view showing one of the so-called "quantity-checks."

The numeral 1 represents the supply-pipe which leads from the storage-tank, (not shown,) wherein the skimmed milk has been accumulated, to the valve casting or seat 2. Said valve casting 2 is provided with an ordinary three-way valve 3 and with proper ports for coöperation with the ports of the three-way valve. Said casting 2 is tapped by a pair of branch pipes 4 and 5, the former of which leads to a suitable liquid-receptacle 6, tapping the same at the bottom, while the latter pipe leads to the proper point of discharge and would usually be provided with an ordinary stop-cock or faucet. (Not shown).

The receptacle 6 is preferably cylindrical in form and should be of such size that it will hold at one time the largest quantity of milk to which any customer would be entitled. In the receptacle 6 is located a float 7, which, as shown and preferred, is in the form of a drum or hollow piston which fits the interior of receptacle 6 sufficiently close to make the walls of said receptacle serve as a guide for the float.

To the float 7 is attached centrally thereof a vertically-disposed and tapered or wedge-shaped standard 8, which, as shown, works through a slot 9 in the top of the receptacle 6, the purpose and action of which standard will be hereinafter fully described. To properly guide the standard 8, it is provided with a long slot $8^a$, and the top of the receptacle 6 is provided with a fixed pin $8^b$, which works in said slot.

To give access to the interior of the receptacle 6, its top is preferably provided with a hinged leaf 10, and these side leaves are ordinarily secured down or closed by means of hasp and staple fastenings 11 and padlock 12 or by some other suitable means.

At the rigid section and central portion of the top of the receptacle 6 is a vertical guide tube or stack 13, which incloses the slot 9 and which, as shown, is rectangular in cross-section. Within this guide-tube 13 is a cam-block 14, the bottom of which is provided with inclined cam-surfaces, as shown at 15, and is provided with parallel depending flanges 16, the forward ends of which are beveled, as shown at 17, to insure the proper engagements of the quantity-check on the cam-surface 15.

Working transversely through a suitable seat in the guide tube or stack 13, just below the cam-block 14, is a feed-slide or check-carrier 18, which is recessed, as shown at 19, to form a seat or pocket for the so-called "quantity-checks." The seat or pocket 19 is open or runs out at the inner end of the slide 18, and the said slide is provided at the bottom of said seat with a longitudinally-extended slot 20, through which the wedge-shaped standard 8 of the float 7 may pass without engagement.

The so-called "quantity-check," in its preferred form, is indicated by the numeral 21, and it is provided with a slot or rectangular perforation 22 and with laterally-spaced cam lugs or ears 23 at the end thereof, which should be placed inward when the check is put into use. The cam lugs or ears 23 are so spaced that they are adapted for engagement with the cam-surfaces 15 of the cam-block 14. When the float 7 is raised, the upper end of the wedge-shaped standard 8 will be moved upward through the perforation or slot 20 in the slide 18, through the slot 22 of the quantity-check 21, and between the flanges 16 of the cam-block 14. Under the action of the inflowing milk or liquid the float will be forced upward until it is stopped by the engagement of the edges of the wedge 8 with the extremities of the said slot 22 of the quantity-check 21. This action will more clearly appear in the description of the operation.

The three-way valve 3 is provided with a projecting stem, which terminates in a handpiece 24, and is also provided outward of its seat with a lock-segment 25. This lock-segment 25 is provided with lock-notches 26 and 27, which coöperate with a pivoted detent or lock-piece 28, that is suitably pivoted to ears 29 of the collar 30, which latter, as shown, is secured to the valve-casting 2 by means of a set-screw 31. The said notches 26 and 27 coöperate, respectively, with the detent or lock-piece 28 to hold the three-way valve in its discharging or normal position, as shown in Fig. 6, and in its filling position, as shown in Fig. 7. In the construction illustrated the three-way valve is put under strain to automatically move into its discharging position (shown in Fig. 6) by means of a coiled spring 32 and a link or rod 33', which parts directly connect the lock-segment 25 to one side of the bottom flange of the receptacle 6. Normally the three-way valve is set and locked in its discharging position by the engagement of the detent 28 with the lock-notch 26, and in this position a pivoted and gravity-actuated catch 33, carried by the lock-segment 25, is held in an inoperative position by the free end of the detent 28. The length of the upper end of this so-called "catch" 33 is such that when it is released and thrown by gravity in an approximately vertical position it will project slightly above the lock-notch 26 for a purpose which will hereinafter appear. About midway between the lock-notches 26 and 27 the lock-segment 25 is provided with a cam-notch 34, and very close to the notch 26 is provided with another and similar cam-notch 35, the exact purposes of which will be clearly brought out in the description of the operation. It may be here stated, however, that these so-called "cam-notches" 34 and 35 permit the movement of the three-way valve from its discharging position (shown in Fig. 6) toward its filling position, (shown in Fig. 7,) as under this movement their beveled sides cam or lift the free end of the detent 28 upward, as will be clearly apparent, but prevent the reverse movement of the same when engaged by the detent 28. It may be here further stated that the position of the notch 34 is such that it will be engaged by the detent 28 immediately after the passage leading to the faucet—that is, to the pipe-section 5—has been closed.

The inner end of the detent 28 is connected by a rod 36 to one end of a lever 37, which is pivoted at its intermediate portion on a standard 38, secured to the rigid and central section of the top of the receptacle or tank 6. The other end of the lever 37 is connected to the cam-block 14, as shown, by means of a screw 39. A spring 40 placed between the cam-block 14 and the lever 37 permits a yielding movement of the lever 37 with respect to the said cam-block.

A suitable housing (indicated by the numeral 41) is placed over the operating mechanism and suitably secured to prevent tampering with the said mechanism. Suitable passages, through which the handpiece 24 and the feed-slide 18 work, are provided in the housing. The quantity-checks fed into the housing are dropped into a pocket 42, formed on the rigid section of the top of the receptacle 6. The checks may from time to time be removed from this pocket 42 through a door 43, provided at one end of the housing. This door will ordinarily be secured by some suitable lock, and, as shown, is secured by a hasp-and-pin fastening 44 and a padlock 45.

As a simple means for preventing the float from rotating within the receptacle 6 it is provided with peripheral notches 46, with which vertical feathers or flanges 47 on the interior of said receptacle loosely engage.

It is intended as a part of my present scheme to provide a plurality of the so-called "quantity-checks" corresponding to the different quantities or different amounts of milk or liquid which it may be desired to draw off from time to time and to provide the checks corresponding to the different quantities with slots of different lengths, which slots are so related to the wedge-shaped standard 8 as to give the predetermined quantity when the particular check is used as a stop to limit the upward movement of the float. These quantity-checks are for convenience preferably marked to indicate the quantity of milk which the customer may obtain by the use of the same in connection with the feed-slide and lock-tripping mechanism.

The operation of the apparatus above described will be substantially as follows: Normally the parts stand in the position indicated in Figs. 1, 2, 4, and 6, in which position the three-way valve is locked in its so-called "discharging position"—that is, in a position to permit the escape of the skimmed milk or liquid from the receptacle 6 through the pipe-sections 4 and 5 and the faucet. (Not shown.) The customer is given a check or checks which correspond to the amount of skimmed milk to which he is entitled, and no further attention need be given by the purchaser of the cream to the subsequent use of the checks. The customer simply goes to the apparatus and places his check in the seat or socket 19 of the slide or carrier 18 with the pair of cam lugs or ears 23 thereof positioned upward and inward, and then forces the said slide or carrier inward to its limit. Under this movement the said cam lugs or ears 23 are forced into engagement with the inclined or cam surfaces 15 of the cam-block 14, thereby forcing the said cam-block upward. The upward movement of the cam-block 14, acting through the lever 37 and rod 36, will raise the free end of the detent 28 above the lock-notch 26, thus releasing the three-way valve and its lock-segment 25 and permitting the upper free end of the gravity-actuated catch 33 to swing under the free end of the said detent 28, and thereby prevent the said detent from falling back into the said lock-notch 26. As soon as the cam lugs or ears 23 have passed beyond the cam-block 14 the said cam-block will under the combined action of gravity and tension of the spring 40 be thrown downward behind the upper portions of the said lugs, and in this way it is made impossible to withdraw the quantity-check which has once been used by the subsequent outward movement of the slide 18 or by other means. However, the catch 33 holds the detent 28 inoperative for the time being, so that the operator by taking hold of the handpiece 24 or any suitable extension therefrom may move the three-way valve into its so-called "filling position," (shown in Fig. 7,) or, in other words, into a position to permit the flow of the skimmed milk through the supply-pipe 1 and branch pipe 4 into the bottom portion of the receptacle or tank 6. As the skimmed milk or liquid flows into the receptacle 6 it will of course force the float 7 and its wedge-shaped standard 8 upward. As the said wedge-shaped standard 8 is moved upward it will pass through the slot 20 of the slide 18 without engagement and will pass through the perforation or slot 22 of the quantity-check 21 and will move upward until its edges engage the extremities or ends of the said slot 22. The quantity-check then becomes a stop to limit the farther upward movement of the standard 8 and float 7 with respect thereto; but the force of the said float is sufficient to raise the said quantity-check and the cam-block 14, which latter at this time is resting on the body of the same, and this upward movement of the said cam-block 14 will, through the levers 37 and rod 36, raise the free end of the detent 28 out of its set engagement with the lock-notch 27, thereby permitting the spring 32 to become active and quickly throw the three-way valve back into its normal or discharging position. (Indicated in Figs. 2 and 6.) The final portion of this return movement of the three-way valve and its lock-segment 25 brought the upper free end of the catch 33 into engagement with the free end of the said detent 28, and thereby forced the said catch 33 into an inoperative position, as shown in Fig. 2. In this position of the parts as soon as the skimmed milk starts to run from the receptacle 6 the float 7, standard 8, quantity-check 21, and cam-block 14 will lower slightly, thereby permitting the detent 28 to again engage the lock-notch 26, and thereby lock the three-way valve and its lock-segment in their normal positions. It should be here stated that the arrangement is such that when the cam-block 14 is raised by the camming action of the cam-lugs of the quantity-check it will be raised slightly higher than it will when acted upon by the lifting action of the float 7 by reason of the lugs 23, so that in the former case the said detent will be raised entirely above the upper end of the detent 33, while in the latter case it will be raised only high enough to clear the edge of the lock-segment 25, but in position to strike the upper end of the said catch 33, as just described. Were it not for the cam-notch 35 the operator would be very liable to give the valve and its lock-segment a slight movement and then permit the same to move backward a little, thereby permitting the detent 28 to again engage with the lock-notch 26 without first having moved the valve into its filling position. In this way the customers would be liable to lose a great many of their checks without receiving the proper returns in skimmed milk. However, the engagement of the detent with the said cam-notch 35 prevents this premature return movement of the valve and its lock-segment.

As already indicated, the engagement of the detent 28 with the cam-notch 34 prevents the valve from being prematurely returned to its discharging position.

From the foregoing description and statements made it will be understood that my present invention is capable of a very large range of modification in the details of its construction.

In the specification and in the claims the so-called "float" partakes probably as much of the nature of a piston as it does strictly of a float, and it will therefore be understood that this term is used generically to include parts that are caused to move either from the pressure of the liquid or from their own buoyancy.

What I claim, and desire to secure by Letters Patent of the United States, is as follows:

1. The combination with a liquid-containing receptacle, of valve mechanism normally set in one position, for discharging, and movable into another position, for filling, a lock for holding said valve mechanism in its normal position, a trip for said lock, a float in said liquid-containing receptacle, and devices under control of a quantity-check for rendering said float operative to actuate said trip and release said lock, substantially as described.

2. The combination with a liquid-containing receptacle, of valve mechanism normally set in one position, for discharging, and under strain to move into another position, for filling, a lock for holding said mechanism in its normal position, a trip for said lock, a float within said liquid-containing receptacle, and a quantity-check for rendering said float operative to actuate said trip and to release said lock, substantially as described.

3. The combination with a liquid-containing receptacle, of valve mechanism normally set in one position, for discharging, and movable into another position, for filling, of a lock operative to hold said valve mechanism both in its discharging and filling positions, a float in said receptacle, a trip for said lock, under control of a quantity-check operative on said trip to primarily release said lock and serving as a stop to limit the upward movement of said float, substantially as described.

4. The combination with a liquid-containing receptacle, of valve mechanism normally set in one position, for discharging, and movable into another position, for filling a lock operative to hold said valve mechanism in its normal position, a trip for said lock involving a cam block or head, a float in said receptacle provided with a tapered standard, said cam block or head adapted to be controlled by a quantity-check to release said lock, and said check having a perforation or seat engageable with said tapered stem or standard to limit the upward movement of said float and cause the same to again actuate said trip to permit said valve mechanism to be returned to normal position, substantially as described.

5. The combination with a liquid-containing receptacle, of valve mechanism normally set in one position, for discharging, and movable into another position, for filling, a lock operating to hold said valve mechanism in its normal position, a trip for said lock involving a vertically-movable cam block or head and a transversely-movable feed-slide a float within said receptacle, said feed-slide constructed to carry a quantity-check into engagement with said cam-block, to actuate said trip and serving later as a stop to limit the upward movement of said float and cause said float to again actuate said trip, substantially as described.

6. The combination with a liquid-containing receptacle, of valve mechanism normally set in one position, for discharging, and movable into another position, for filling, a lock operating to hold said valve mechanism in its discharging and filling positions, a trip for said lock, involving the vertically-movable cam-block and the transversely-movable feed-slide having a recess or seat, a float in said receptacle having a tapered stem or standard, said slide adapted to carry a quantity-check having one or more cam-acting end lugs for action on said cam-block, and provided with a slot or perforation for coöperation with said stem or standard to limit the upward movement of said float, the said parts operating substantially as and for the purposes set forth.

7. The combination with a liquid-containing receptacle, containing a float with tapered stem or standard, of valve mechanism normally set in one position, for discharging, and movable into another position, for filling, a lock operating to hold said valve mechanism in its discharging and in its filling positions, a trip for said lock involving the cam-block with a yielding connection to said lock and the feed-slide having a recess or pocket, adapted to carry a quantity-check having the projecting cam-lugs at one end and the elongated perforation or slot in its body, the said parts operating substantially as described.

8. The combination with a liquid-containing receptacle, of valve mechanism normally set in one position for discharging and movable into another position for filling, a vertically-pivoted lock-segment having a notch, a detent adapted to engage the notch, a gravity-catch pivoted on the segment below the notch and normally held inoperative by said detent, but operative to hold said detent inoperative after it has been released and until after certain movements of the valve mechanism have been performed.

9. The combination with a liquid-containing receptacle of valve mechanism controlling the delivery of the fluid therefrom, a lock or latch for holding said valve mechanism in a set position, a trip for said lock, a float in said receptacle, said trip and float being under the control of a quantity-check to thereby trip the lock by movement of the check and thereafter to and determine the rise of the float.

10. The combination with a liquid-containing receptacle, of valve mechanism controlling the delivery of the liquid therefrom, a lock or latch for holding said valve mechanism in a set position, a float in said receptacle, and a trip for said lock, which trip is adapted to be primarily operated by movement of a quantity-check, and which float is adapted to be stopped by said check, said float acting through the check to again actuate the trip.

11. The combination with a liquid-containing receptacle, of valve mechanism for controlling the delivery of the fluid therefrom, a lock for holding said valve mechanism in one position, a trip for said lock, a float within the receptacle, the upward movement of the float being controlled by a quantity-check which serves as a stop for the float and causes the same to actuate the trip to release said lock.

In testimony whereof I affix my signature in presence of two witnesses.

ADELBERT D. HILL.

Witnesses:
M. M. McGRORY,
F. D. MERCHANT.